March 21, 1933.　　　J. N. LA BRANCH　　　1,902,409
AIR VENTING DEVICE
Filed Jan. 12, 1931　　　2 Sheets-Sheet 1
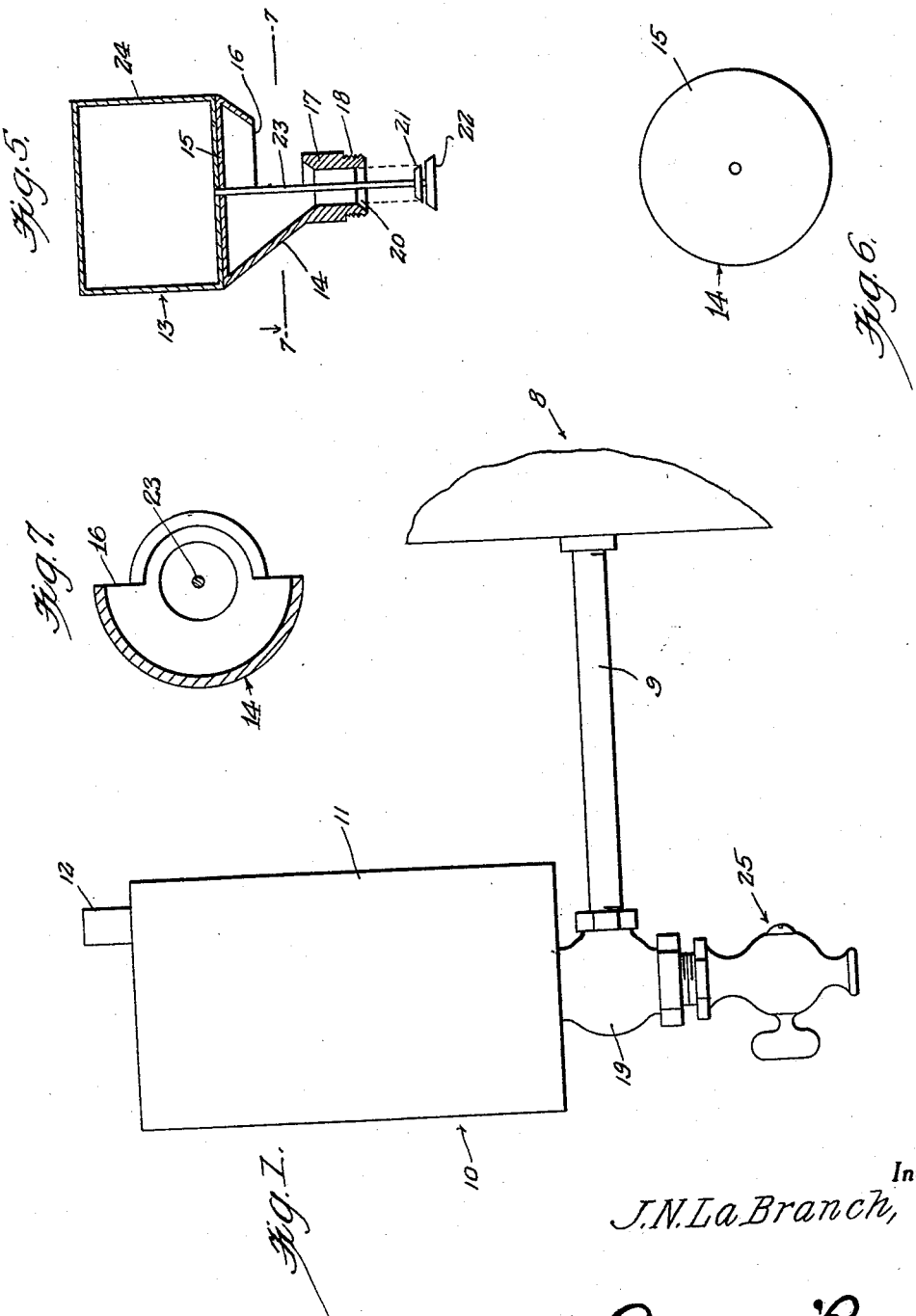
Inventor
J. N. La Branch,
By Clarence A. O'Brien
Attorney March 21, 1933.  J. N. LA BRANCH  1,902,409
AIR VENTING DEVICE
Filed Jan. 12, 1931   2 Sheets-Sheet 2
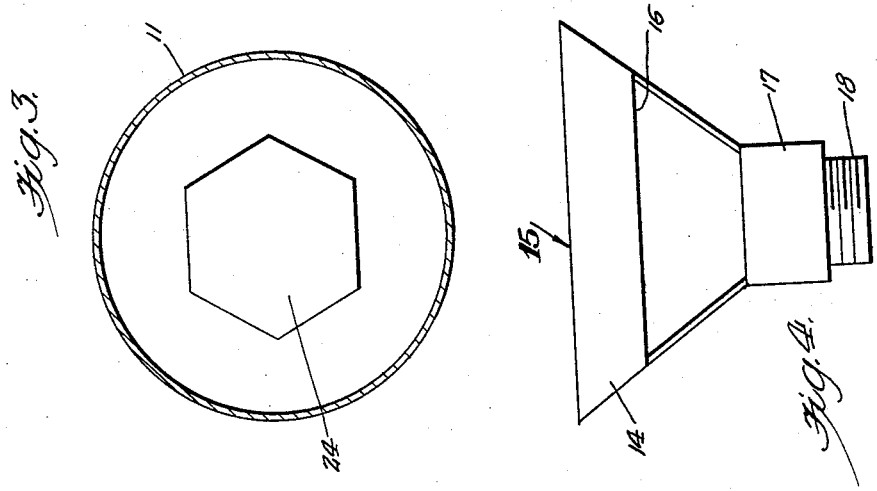
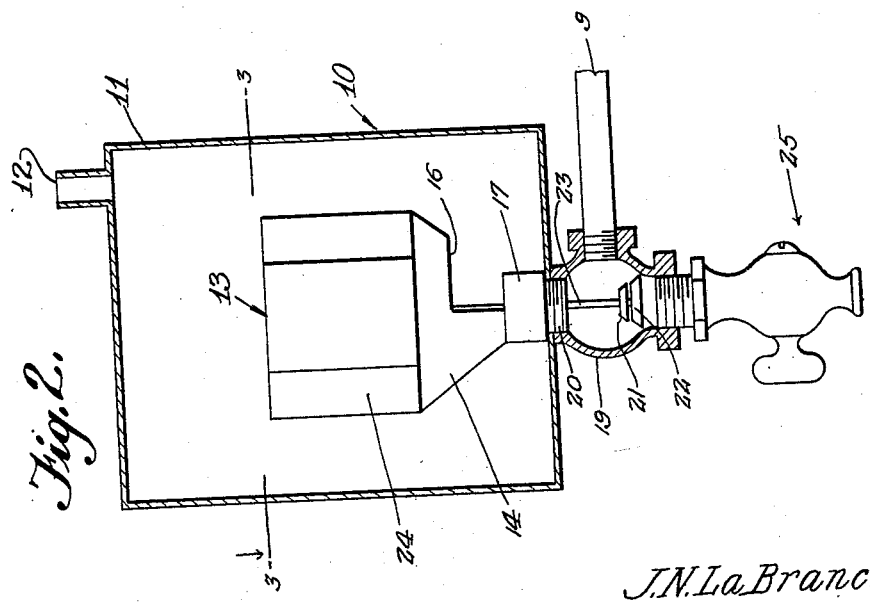
Inventor
J. N. La Branch,
By Clarence A. O'Brien
Attorney Patented Mar. 21, 1933

1,902,409

UNITED STATES PATENT OFFICE

JEFFERSON N. LA BRANCH, OF SAN DIEGO, CALIFORNIA

AIR VENTING DEVICE

Application filed January 12, 1931. Serial No. 508,289.

This invention relates to a device for automatically venting air from liquid containing tanks.

In carrying the invention into practice, I have evolved and produced a structural arrangement of parts of an interchangeable and separable nature and of appropriate configuration and design to fulfill the requirements of a vent appliance of this class in a dependable and highly satisfactory manner.

In the drawings:

Figure 1 is a side elevational view showing the device in association with a tank.

Figure 2 is a sectional view through the float chamber showing the float mechanism in elevation.

Figure 3 is a horizontal sectional view taken on the line 3—3 of Figure 2 looking downwardly.

Figure 4 is an elevational view of the float support and valve seat.

Figure 5 is a vertical sectional view through the float mechanism.

Figure 6 is a top plan view of the float support, and

Figure 7 is a horizontal sectional view taken on the line 7—7 of Figure 5 looking downwardly.

In the general assembly seen in Figure 1, the associated tank is denoted by the numeral 8. Attached to this by a communicating pipe 9 is the device of the invention which is generally designated by the numeral 10 for automatically venting the tank of air to enable filling and extraction of liquid from the tank.

The device 10 as shown in Figure 2 comprises a suitable float chamber 11 having an air vent or outlet 12 at its top communicated with the atmosphere. In the interior of the chamber is a float valve mechanism generally designated 13 which comprises a hollow, frustro-conical float support 14 having a flat disc-like top 15 and an air discharge opening 16 in one side. The float support acts also as an air-baffle. A collar 17 having a screw-threaded nipple 18 depends from the lower part of the lower end of the float support. The nipple 18 is passed through an opening in the float chamber and is threaded into the upper end of the valve casing 19.

The lower end of the nipple 18 is interiorly bevelled to provide a valve seat 20. The numeral 22 designates a valve on the lower part of the valve stem 23 which extends slidably through a concentric guide hole in the flat top 15 of the float support 14. On the upper end of the valve stem 23 is a suitably shaped float 24. Thus the float support 14 comprises in itself a rest for the float, a guide for the valve stem, and a seat for the valve. Moreover, it constitutes means for baffling air as it comes into the float chamber 11.

The tank connection pipe 9 is connected with one side of the valve casing 19. A drain cock 25 is threaded into the lower end of the valve casing for test purposes.

The invention is especially adaptable for use with water and oil containing tanks. It operates automatically to control the entry and release of air from the tank, as the tank is filled with liquid. The rise of fluid in the float chamber 11 causes the float 24 to rise and bring the valve 22 into closing relation with the valve seat 20. The disk 21 on the stem above the valve 22 is small enough to enter the bore of the valve casing 19 so as to gradually cut off the flow of air until the valve 22 reaches its seat whereby regurgitations are avoided.

As the level of the liquid in the tank and float chamber falls, the float drops down and unseats the valve. Fluid which had accumulated in the line 9 and float chamber then drains back into the tank, permitting atmospheric air to be drawn into the tank through the float chamber from its vent 12.

It is thought that the description taken in connection with the drawings will enable a clear understanding of the invention to be had. Therefore, a more lengthy description is thought unnecessary.

When the float raises the valve stem, the disk 21 and the valve 22, the disk 21 passes into the nipple 17 and the pressure of the liquid coming into the globular valve casing pushes against the disk 21. This pushes the valve to its seat and also raises the float 24 slightly.

The pressure of the liquid in the globular valve casing also operates to hold the valve 22 on its seat so that as soon as this pressure is released the valve drops down, and the liquid in the float chamber drains out, allowing the float to come to rest on the float support where it remains until the tank is filled again.

While the preferred embodiment of the invention has been shown and described, it is to be understood that minor changes coming within the field of invention claimed may be resorted to if desired.

I claim:

1. An air venting device of the character described, comprising, a closed casing, an air vent leading from the casing, an air and fluid conduit intake opening in the casing, a float valve structure having a part thereof within the casing and a part thereof outside the casing, said structure comprising an inverted hollow conical body having an opening in one side and a closed top, a neck depending from the lower end of the body, a reduced screw threaded portion on the lower end of the neck defining a shoulder on the neck and adapted to be received through said intake opening so as to rest said shoulder upon the part of the casing surrounding said intake opening, a T-shaped fitting having a globular body portion, one of the arms thereof being threaded upon the lower end of the said reduced portion so as to engage the exterior of the closed casing adjacent said intake opening, an air and fluid conduit connected with a lateral arm of the fitting, and a test spigot in the lowermost arm of the fitting; a float adapted to come to rest upon the top of the body, a valve stem depending from the float through a guide hole in the top of the said body and into said globular body portion, a collar near the lower end of the stem adapted to enter snugly said neck, a valve on the lower end of the stem, a valve seat in the lower end of said reduced portion of the neck adapted to seat said valve.

2. An air venting device for a container, comprising a closed casing having a vent open to the atmosphere, a float valve mechanism in the casing comprising an inverted hollow frustro-conical float support and baffle having an opening in one side thereof, a hollow threaded portion on the lower end of the valve support extending through an opening in the casing, a valve body threaded on the threaded portion outside of the casing, a pipe threaded portion outside of the casing, a pipe adapted to be connected to the container to be vented and communicated through one side of the valve body, a valve stem movable through an opening in the top of the float support, a float on the upper end of the stem adapted to rest upon the valve support in its fully depressed position, a valve on the lower end of the stem, a valve seat in the lower end of the threaded portion of the float support with which the valve seats in its fully raised position, said valve being located below the point of entry of the pipe when in its fully depressed position, so as to be acted upon by incoming fluid in a manner to delay the same in depressed position until sufficient fluid has been permitted to pass into the closed casing to buoy and raise the float, said valve being adapted to be acted upon by incoming fluid when in a partly raised position so as to be positively moved toward seating with the valve seat, said stem being so proportioned that the float is raised from the float support to seat the valve.

3. An air venting device for a container, comprising a closed casing having a vent open to the atmosphere, a float valve mechanism in the casing comprising an inverted hollow frustro-conical float support and baffle having an opening in one side thereof, a hollow threaded portion on the lower end of the valve support extending through an opening in the casing, a valve body threaded on the threaded portion outside of the casing, a pipe extending from the tank and communicated through one side of the valve body, a valve stem movable through an opening in the top of the float support, a float on the upper end of the stem adapted to rest upon the valve support in its fully depressed position, a valve on the lower end of the stem, a valve seat in the lower end of the threaded portion of the float support with which the valve seats in its fully raised position, said valve being located below the point of entry of the pipe when in its fully depressed position, so as to be acted upon by incoming fluid in a manner to hold the same in depressed position until sufficient fluid has been permitted to pass into the closed casing to buoy and raise the float, said valve being adapted to be acted upon by incoming fluid when in a partly raised position so as to be positively moved toward seated position, said stem being so proportioned that the float is raised from the float support to seat the valve, and a disk on the stem above the valve of a size to pass into the bore of the threaded portion and in such disposition be acted upon by incoming fluid to aid the valve toward seated position and raise the float from the float support.

In testimony whereof I affix my signature.

JEFFERSON N. LA BRANCH.